July 19, 1927.

P. D. WRIGHT

VALVE

Original Filed Nov. 20, 1920    2 Sheets-Sheet 1

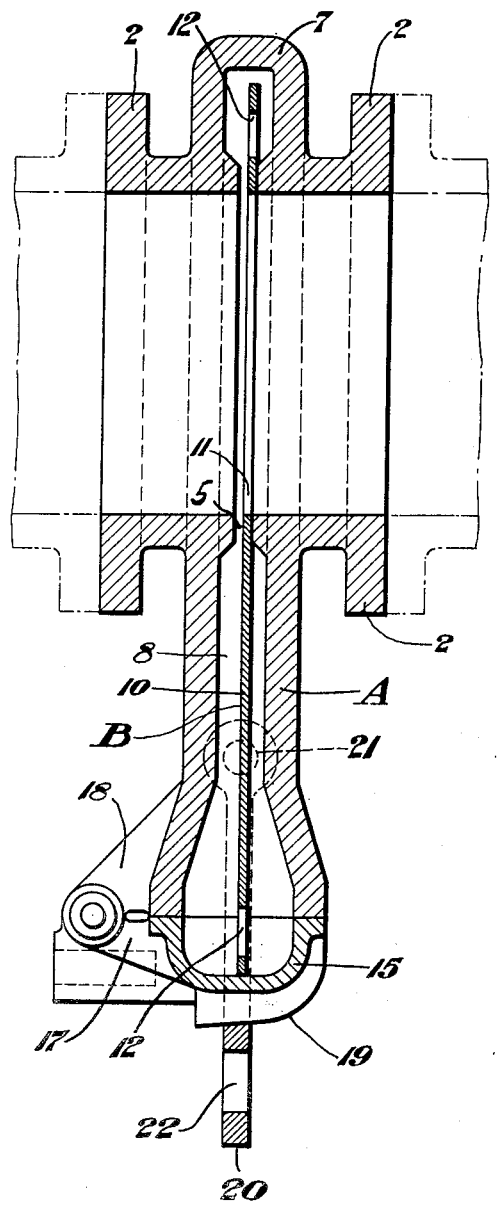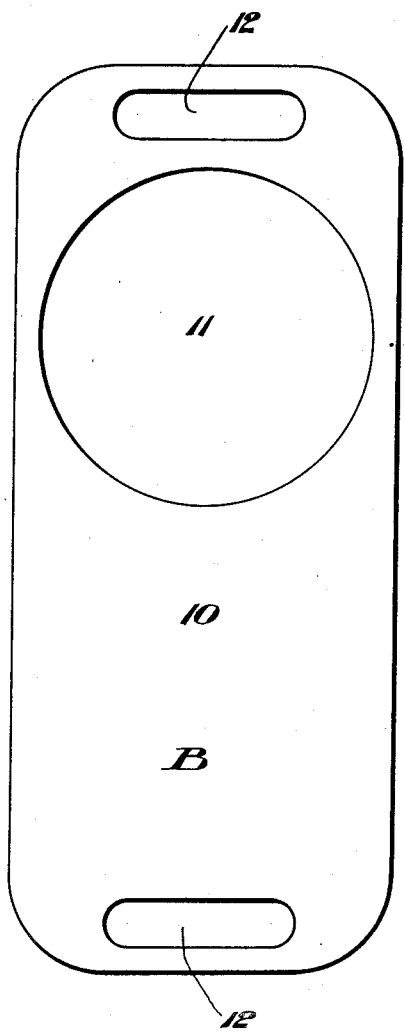

Patented July 19, 1927.

1,636,618

UNITED STATES PATENT OFFICE.

PAUL D. WRIGHT, OF WILKINSBURG, PENNSYLVANIA.

VALVE.

Application filed November 20, 1920, Serial No. 425,529. Renewed November 24, 1925.

My invention relates to valves, and more particularly to that class of valves having sliding gates, and has for one of its objects the provision of such a valve that is especially adapted for use on either suction or blast air lines for conveying finely divided solid material such as coke screenings or "coke breeze."

Another object of the invention is to provide an improved form of valve body having housing portions adapted to entirely enclose the gate in either its closed or open position.

A further object of this invention is to provide at least one of the housings with an improved form of closure and with novel means for holding the closure in position.

A still further object of my invention is to provide a valve having certain novel constructional features and combinations tending to improve the general efficiency and durability of a valve of this particular character.

With these and other objects in view, one embodiment of my invention is illustrated in the accompanying drawings, in which—

Figure 3 is a sectional elevation on the line III—III of Figure 1.

Figure 4 is a plan of the valve gate.

Figure 2:
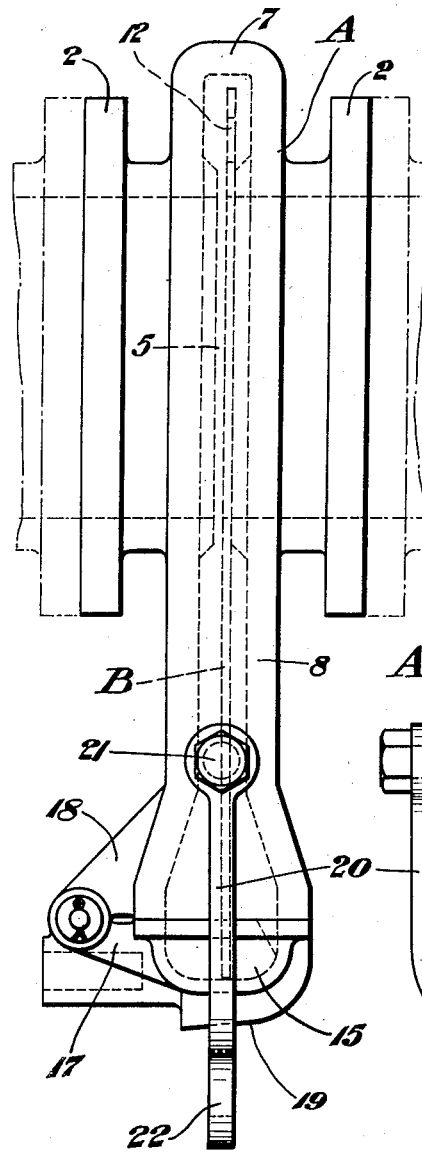
Figure 2 is a side elevatiion of the valve of Figure 1.
Figure 1:
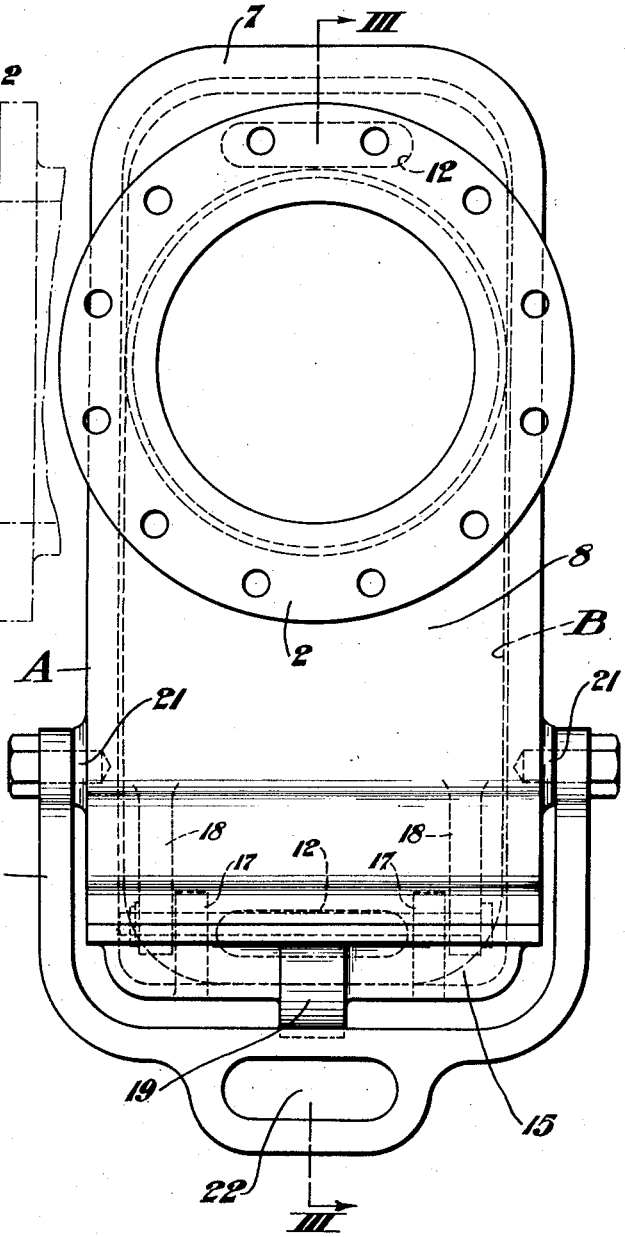
Figure 1 is a top plan of a valve made in accordance with my invention.

Referring particularly to the drawings, the letter A designates the valve body as a whole, which is adapted to be mounted in a pipe line of a fluid pressure conveyer for finely divided solid material, and is provided with connecting flanges 2 on each side adapted to abut suitable coacting flanges on the pipes and to be secured in place by bolts or rivets passing through other apertures in the coacting flanges on the pipes.

A suitable transverse guideway or slot 5 is formed in the body of the valve for the passage of a sliding gate B.

Hollow projections or housings 7 and 8 are formed integral with the respective end walls of the body portion and communicate with the guideway 5 so as to receive the gate B which is slidably mounted in the guideway in the valve body, and comprises a solid or cut-off portion 10 and an open portion 11 adapted to permit communication through the valve body. A hand-hold 12 is formed adjacent each end of the gate to facilitate handling it.

The housing 7 is closed by an integral end wall or head, and is relatively short, being of sufficient depth only to receive the short portion of the gate B which extends past the open portion 11 and has hand-hold 12 therein.

The housing 8 has an open end adapted to be closed by a cover 15 hinged to the housing side wall. Housing 8 is of sufficient depth or length to completely enclose the unused portion of the gate. That is, if the gate be in open position the cut-off portion 10 and the hand-hold portion 12 beyond the cut-off portion 10 will be enclosed within the housing 8, and if the gate be in closed position the open portion 11 and its associated hand-hold will be enclosed.

The cover 15 is provided with projections or ears 17 on its rear face adapted to be pivotally secured to other projections 18 on the rear side of the housing 8 forming a hinge mounting. The top face of cover 15 is provided with an upwardly projecting ridge 19 which increases in thickness toward its rear end, forming a cam or wedge like member adapted to be engaged by a U-shaped latch 20 pivotally mounted at 21 to the housing 8, and having a hand-hold 22 formed on its closed end.

The latch 20 is adapted to be moved up over the cover 15, and to engage the ridge 19 and be forced against the same, which, due to the increasing thickness of the ridge, will cause a wedging action and force the cover 15 firmly into place. In Figure 3 of the drawings, the valve member 10 is shown in its open position, that is to say with its port 11 registered with an establishing communication between the inlet and outlet ports of the valve chamber or casing. In order to close the valve, the displaceable closure 15 is swung outwardly and the valve body 10 is entirely withdrawn endwise through the combined entrance and exit opening at the outer end of the casing extension 8, after which the valve body is reversed endwise and thrust back into the valve chamber into its reversed position with the valve port 11 lying entirely within the casing extension 8, and the imperforate portion of the valve member interposed between and cutting off communication between the inlet and outlet ports of the valve casing. It will now be understood that the valve member B is capable of lying within the valve casing and its extension in endwise reversed positions. In one position only of the valve is its port 11 disposed to establish communication between the ports of the casing. In the other position of the valve member, the port 11 thereof is within the extension 8, and the remaining portion of the valve closes communication between the inlet and outlet ports of the casing. When the displaceable closure 15 is open, to enable the withdrawal of the valve and its replacement in an endwise reversed position, atmospheric air will be drawn in through the combined entrance and exit opening, which will result in the cleaning out of any accumulations of any finely divided material which might otherwise interfere with the replacement of the valve body.

The operation of this valve will be readily apparent to those skilled in the art. When it is desired to change the position of the gate B so as to either open or close the valve, the latch 20 is forced forward until it is released from the ridge 19 on the cover 15. The cover is then swung open. The gate B may now be pulled out of the valve, reversed, or turned end for end, and again inserted in the valve. After the gate has been positioned in the valve the cover 15 is again closed and locked in position by the latch 20.

This improved construction of valve is for use in high pressure suction or blast lines and due to the lack of glands, stuffing boxes, packing rings, etc., it is much more efficient than the valves of prior constructions, since such glands, stuffing boxes, packing rings, etc., invariably allow more or less leakage and when worn the leakage is increased.

It will be readily seen that I have produced an improved form of valve of the sliding type, and one that is far more efficient and less liable to get out of order than those heretofore constructed.

While I have shown and described one particular form of valve embodying my invention, it will be understood that I do not wish to be limited to such construction, since it is only illustrative, and various modifications may be made within the scope of the appended claims without departing from the spirit of my invention.

I claim:—

1. A valve comprising a hollow valve body having a guide slot formed therein, a closed hollow integral projection formed on its one side and communicating with said slot, a second hollow integral projection on the opposite side of said valve body and provided with an open outer end, said projection being of considerable greater length than said first mentioned projection, a cover hinged to said second projection and adapted to close the open end thereof, means for locking said cover in place, and a slidable gate adapted to fit within said valve body and have its ends enclosed in said projections, said gate being substantially rectangular in shape and having a solid cut-off portion and an open passage portion, and said projections being adapted to completely house the portions of said gate projecting beyond the valve body.

2. A valve for use in suction conveyer systems for conducting finely divided solid materials, comprising a casing having registering ports at opposite sides and having an extension projecting laterally therefrom, an elongated gate having at one end a port adapted to register with the ports in the casing and having at the other end a closed portion so that when the valve is inverted the closed portion will be in register with the ports, said gate being removable endwise from the casing so that it may be inverted to reverse its position, a cap for the end of the casing adapted to be readily fastened in place or removed and adapted when fastened in place to hold the gate against substantial longitudinal movement, the thickness of the gate being less than the space between the opposite sides of the casing so that the gate is free to be moved by the suction and held firmly against its seat, the opening of the cap serving to permit the suction to draw air through the casing to clean it.

3. A valve for use in fluid pressure conveyer systems for conducting finely divided solid materials, comprising a casing having registering ports at opposite sides and having an extension projecting laterally therefrom, an elongated gate mounted in said casing and extending into said laterally projecting extension, said gate being removable endwise from said casing so that it may be inverted to reverse its position, a cap for the end of said casing adapted to be readily fastened in place or removed and adapted when fastened in place to hold the gate against substantial longitudinal movement, the thickness of the gate being less than the space between the opposite sides of the casing so that the gate is free to be moved by the fluid pressure in the conveyer system and held firmly against its seat, the opening or removal of the cap serving to permit a forced flow of air through the casing to clean it.

In testimony whereof, I have hereunto signed my name.

PAUL D. WRIGHT.